(12) United States Patent
Shen et al.

(10) Patent No.: US 9,306,773 B2
(45) Date of Patent: Apr. 5, 2016

(54) ORTHOGONAL FREQUENCY DIVISION MULTIPLEXING (OFDM) CHANNEL ESTIMATION TO IMPROVE THE SMOOTHING PROCESS

(71) Applicant: SPREADTRUM COMMUNICATIONS (SHANGHAI) CO., LTD., Pudongxinqu, Shanghai (CN)

(72) Inventors: Xuqiang Shen, Shanghai (CN); Qiang Cao, Shanghai (CN); Xiaojian Dong, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 185 days.

(21) Appl. No.: 14/233,165

(22) PCT Filed: Apr. 28, 2013

(86) PCT No.: PCT/CN2013/074999
§ 371 (c)(1),
(2) Date: Jan. 16, 2014

(87) PCT Pub. No.: WO2014/110876
PCT Pub. Date: Jul. 24, 2014

(65) Prior Publication Data
US 2015/0319011 A1    Nov. 5, 2015

(30) Foreign Application Priority Data

Jan. 17, 2013  (CN) .......................... 2013 1 0017896

(51) Int. Cl.
*H04L 25/02* (2006.01)
*H04L 27/26* (2006.01)
*H04L 5/00* (2006.01)

(52) U.S. Cl.
CPC .......... *H04L 25/0204* (2013.01); *H04L 5/0007* (2013.01); *H04L 5/0048* (2013.01); *H04L 25/022* (2013.01); *H04L 27/2628* (2013.01); *H04L 27/2647* (2013.01)

(58) Field of Classification Search
None
See application file for complete search history.

(56) References Cited

U.S. PATENT DOCUMENTS

2009/0046571 A1 *  2/2009  Safar ................... H04L 27/2626
                                                     370/210
2010/0046480 A1 *  2/2010  Kawamura .......... H04J 13/0059
                                                     370/335

(Continued)

FOREIGN PATENT DOCUMENTS

| CN | 1708142 | 12/2005 |
| CN | 101325568 | 12/2008 |
| CN | 101383793 | 3/2009 |

*Primary Examiner* — Chi H Pham
*Assistant Examiner* — Soon-Dong D Hyun
(74) *Attorney, Agent, or Firm* — Soroker-Agmon

(57) ABSTRACT

A method of processing communication signals, is described. The method includes receiving a communication signal in a time domain, converting the communication signal to a frequency domain, providing resource blocks, the resource blocks including a first resource block and a second resource block, the first resource block having a first boundary and a second boundary, the first boundary being adjacent to the second resource block, the second boundary being non-adjacent to other resource blocks, the first resource block including pilot signals, generating a third resource block based on the one or more pilot signals, providing a first waveform based on the resource blocks and the third resource block, applying a smoothing filter against the first waveform to generate a second waveform, and converting the second waveform from the frequency domain to the time domain.

13 Claims, 8 Drawing Sheets

(56) References Cited

U.S. PATENT DOCUMENTS

| | | | | |
|---|---|---|---|---|
| 2012/0294250 A1* | 11/2012 | Pan | H04W 72/0453 | 370/329 |
| 2013/0064204 A1* | 3/2013 | Sun | H04W 28/048 | 370/329 |
| 2013/0176981 A1* | 7/2013 | Earnshaw | H04L 1/02 | 370/329 |
| 2013/0182618 A1* | 7/2013 | Chen | H04L 5/1469 | 370/280 |

* cited by examiner

ORTHOGONAL FREQUENCY DIVISION MULTIPLEXING (OFDM) CHANNEL ESTIMATION TO IMPROVE THE SMOOTHING PROCESS

BACKGROUND

In existing Orthogonal Frequency Division Multiplexing (OFDM) systems, training sequences known to a receiver are generally transmitted on subcarriers of transmitted OFDM symbols, and the receiver performs channel estimation using the training sequences and equalizes data to be demodulated.

Due to the fact that general OFDM systems occupy a certain bandwidth and pilot subcarriers only exist in certain bandwidths, generally OFDM channel estimation is performed by smoothing filtering of the pilot frequencies. However, when no pilot frequency information exists outside the effective subcarriers of the OFDM during the smoothing filtering, significant distortion may occur to the edge when performing the channel estimation.

Further, in an Long Term Evolution (LTE) systems, a base station can transmit a dedicated channel to a user equipment (UE) by beam forming of a smart antenna, but the dedicated channel only occupies certain subbands, and the subbands can transmit dedicated pilot frequencies to the UE. Due to the low bandwidth of the subbands, the subcarriers dedicated to UE are very limited. Therefore, channel estimation generally has a significant edge effect.

With the above described methods, certain edge errors occur. In this situation, if a small amount of subcarriers are allocated to the receiver and located at the edge of pilot frequencies, receptivity declines greatly.

Furthermore, in an OFDM receiver, channel smoothing is performed on the estimated channel in order to reduce the effects of noise on the estimated channel, thereby improving the system packet error performance. FIG. 1 illustrates a single stream OFDM transmitter 102 accepting an input stream s1 104 to a baseband encoder 106 which encoded stream is provided to an inverse fast Fourier transform (IFFT) 108 to produce a plurality of baseband subcarriers such as 1 through 1024 or 1 through 512, and the subcarriers are modulated to a carrier frequency for coupling to an antenna 112 as transmitted signal X. The transmitted signal X is coupled through a channel with a frequency dependent characteristic H to receive antenna 132 of receiver 130 to form received signal Y=HX. The receiver 130 receives signal Y, which is baseband converted using RF Front End 133 and applied to FFT 134 to channel compensator 138 and to decoder 140 which generates the received stream S1'. Channel estimator 136 estimates the channel characteristic H during a long preamble interval, and the channel characteristic H is applied to channel compensator 138.

FIG. 2 illustrates a Multiple Input Multiple Output (MIMO) receiver 240 operative on two transmit streams s1 and s2 204 encoded 206 and provided to first stream IFFT 208 which generates baseband subcarriers, which are provided to RF modulator and amplifier 210 and coupled as X1 to antenna 216. Second stream IFFT 212 and RF modulator and amplifier 214 similarly generate subcarriers which are upconverted and coupled to antenna 218 as X2. Receiver 240 has three antennas 242, 244, 246, which couple to receivers 248, 250, 252 and to output decoder 254 which forms decoded streams s1' and s2'. Each receiver 248, 250, 252 performs the receive functions as described for FIG. 1, however the channel estimation function 249, 251, 253 for each receiver uses the long preamble part of the packet to characterize the channel from each transmit antenna 216, 218 to each receive antenna 242, 244, 246. For example, receiver 248 must characterize and compensate the channel h11 from 216 to 242 as well as channel h12 from 218 to 242. Each channel characteristic h11 and h22 is a linear array containing real and imaginary components for each subcarrier, typically 1 through 1024. The channel estimator 249 therefore contains h11 and h12, estimator 251 contains h21 and h22, and channel estimator 253 contains h31 and h32. The 2.times.3 MIMO case of FIG. 2 shows the case where the number of remote transmitters Nt=2 and the number of local antennas and receivers Nr=3. For a MIMO receiver where the number of remote transmitters is Nt and the number of local antennas and receivers is Nr, the Nt*Nr channels have a frequency response which may be smoothed over a range of subcarrier frequencies using a finite impulse response (FIR) filter for I and Q channels. Such a channel smoothing filter would require a total of 2*Nt*Nr filters. For a 13 tap FIR filter, each tap would have an associated multiplier, so such an implementation would require 13 complex multipliers for each filter, or 26*Nt*Nr multipliers total at each receiver station.

Accordingly, edge distortion of subcarriers in channel estimation caused by edge effect needs to be remedied. Thus, a method for mitigating edge distortion of subcarriers in channel estimation caused by edge effect is needed.

BRIEF SUMMARY

A method of processing communication signals, is described. The method includes receiving a communication signal in a time domain, converting the communication signal to a frequency domain, providing a plurality of resource blocks based on the communication signal in the frequency domain, the plurality of resource blocks, being arranged from left to right, including a first resource block and a second resource block on the right side of the first resource block, the first resource block having a first boundary on the right edge thereof and a second boundary on the left edge thereof, the first boundary being adjacent to the second resource block, the second boundary being non-adjacent to other resource blocks, the first resource block including one or more pilot signals, generating a third resource block based on the one or more pilot signals, providing a first waveform based at least on the plurality of resource blocks and the third resource block, applying a smoothing filter against the first waveform to generate a second waveform, and converting the second waveform from the frequency domain to the time domain.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Aspects of the present invention relate to by calculating phase differences among the subcarriers and average value of edge pilot frequencies, the pilot frequency edge is patched with virtual pilot frequency by phase rotation, then smoothing operation is made to obtain the channel estimation result. Further, by more accurate edge patch operations, the subcarriers on the channel estimation band edge (or edge RB of PDSCH allocated by beam forming) can produce a good channel estimation results. Further aspects of the present invention relate to creating artificial waveform edges of a sine wave in the frequency domain to perform smoothing on the sine wave, and then restoring the waveform back. For example, "fake" waveforms are constructed in frequency domain to be used for smoothing actual waveforms, which is then transformed back to time domain after the smoothing process.

Figure 1:
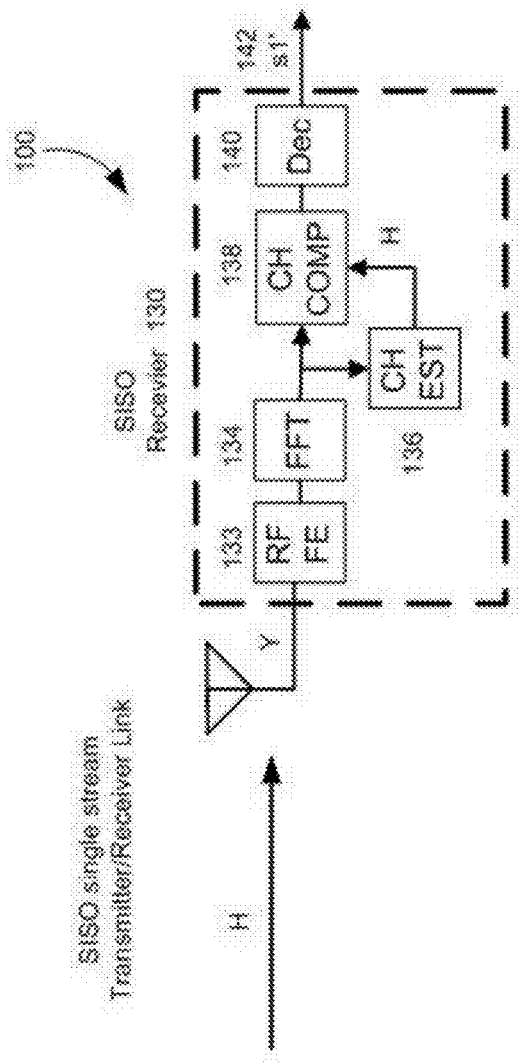
FIG. 1 illustrates a single stream OFDM transmitter.
Figure 2A:
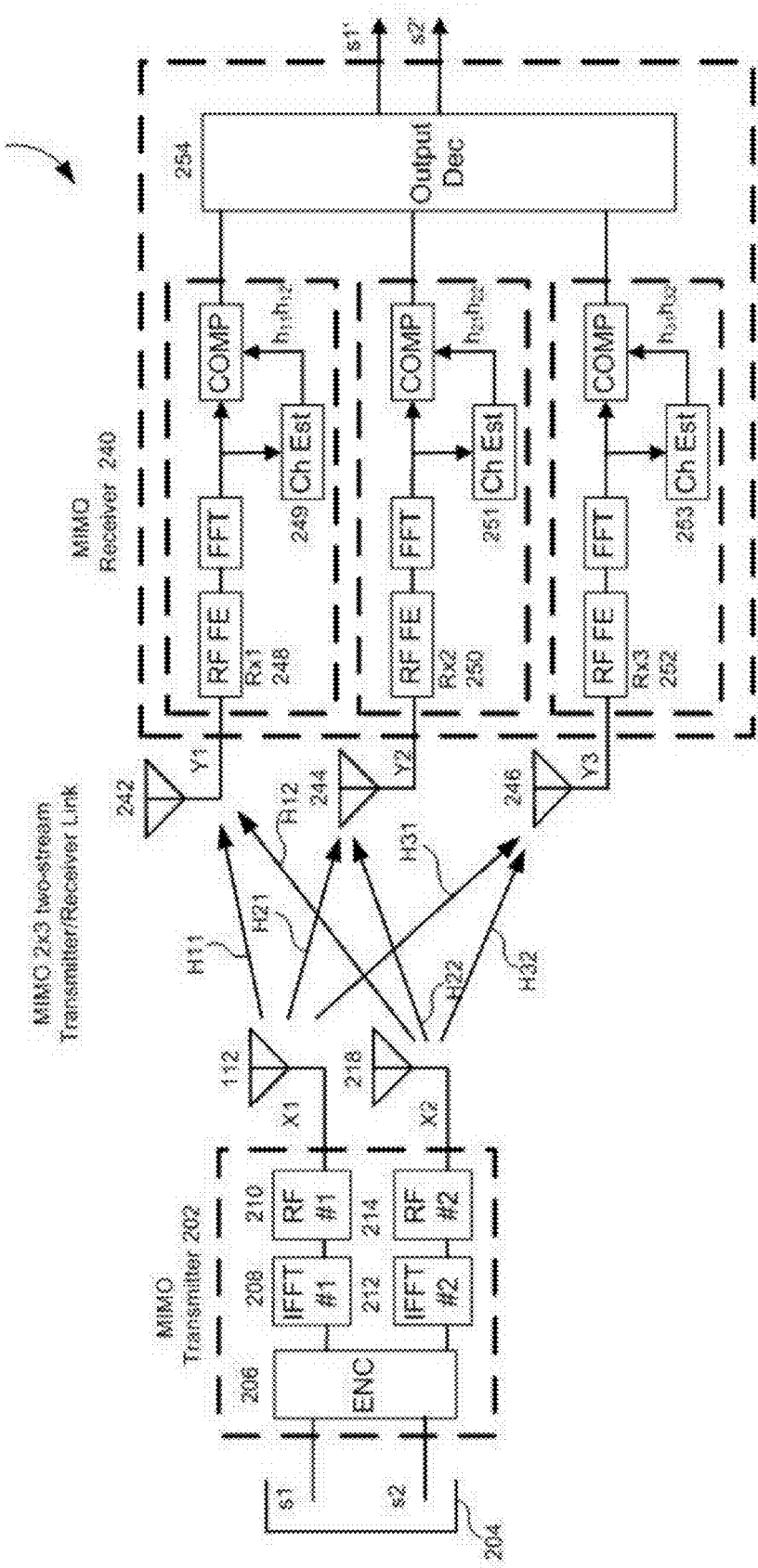
FIG. 2A illustrates a Multiple Input Multiple Output (MIMO) receiver.
Figure 2B:
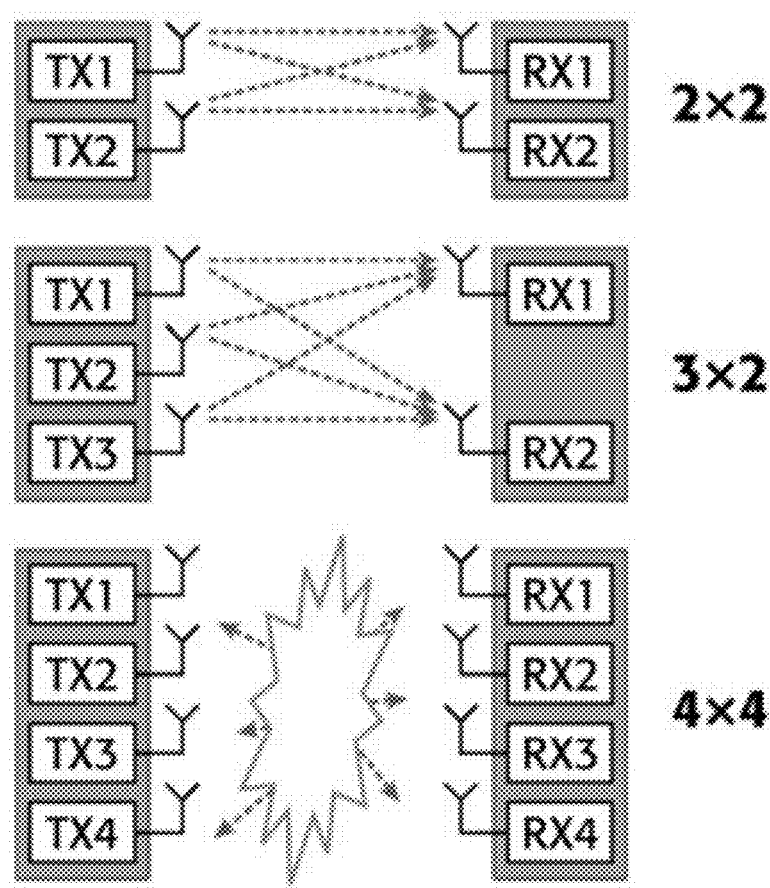
FIG. 2B is a simplified diagram illustrating various types of MIMO configuration.
Figure 3:
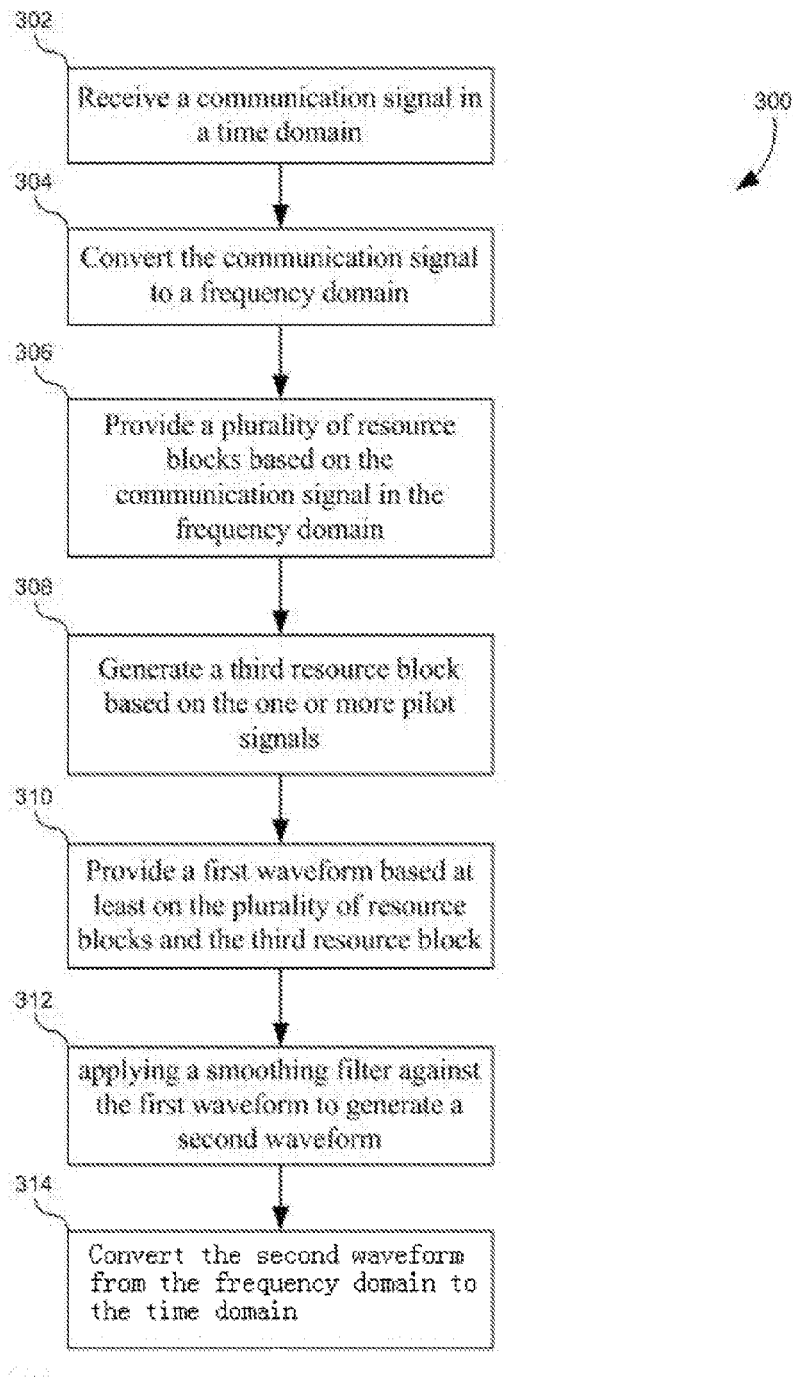
FIG. 3 illustrate a flow diagram for processing a communications signal, according to one embodiment of the invention.

FIG. 3 illustrate a method 300 of processing a communications signal, according to embodiments of the present invention. At process block 302, a communication signal in a time domain is received. Then, the communication signal to a frequency domain is converted (process block 304).

Multiple resource blocks are provided based on the communication signal in the frequency domain (process block 306). In one embodiment, the multiple resource blocks may include a first resource block and a second resource block. Where the first resource block has a first boundary and a second boundary, and the first boundary is adjacent to the second resource block, and the second boundary is non-adjacent to other resource blocks. Further, the first resource block includes one or more pilot signals.

At process block 308, a third resource block based on the one or more pilot signals may be generated. Then, a first waveform based at least on the multiple resource blocks and the third resource block may be provided (process block 310). At process block 312, a smoothing filter against the first waveform to generate a second waveform is applied. In one embodiment, the smoothing filter may include a Weiner filter, a discrete Fourier Transform, etc.

The second waveform from the frequency domain to the time domain may be converted (process block 314). Additionally, the third resource block may be removed, a fourth resource block may be generated at the edge of the second resource block, and the generating of the second waveform may be generated by an average or an estimating waveform.

Figure 4:
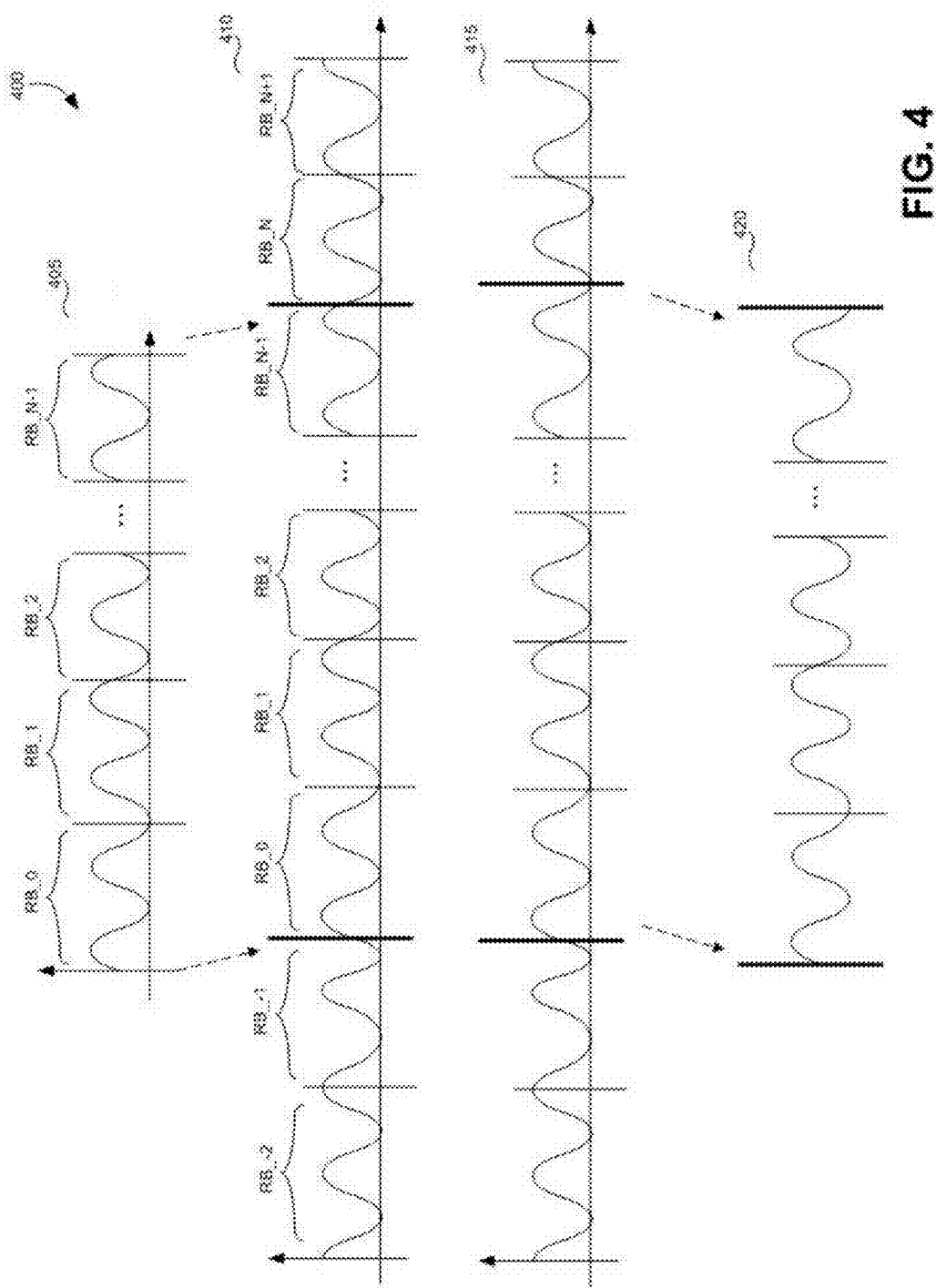
FIG. 4 illustrates waveform diagrams, according to one embodiment of the invention.

FIG. 4 illustrates waveform diagrams, according to one embodiment of the invention. This waveform diagram shows the original waveform 40, which includes RB_0, RB_1, RB_2 to RB_N−1. Then at waveform 410, "fake" waveforms RB_−2 and RB_−1 are added to the front of the waveform, and RB_N and RB_N+1 are added to the end of the waveform. Accordingly, at waveform 415 the smoothing process may be performed. Thus, after the smoothing process is performed, the "fake" waveforms (i.e., RB_−2, RB_−1, RB_N, and RB_N+1), leaving only the original waveform which is now smoothed.

Figure 5:
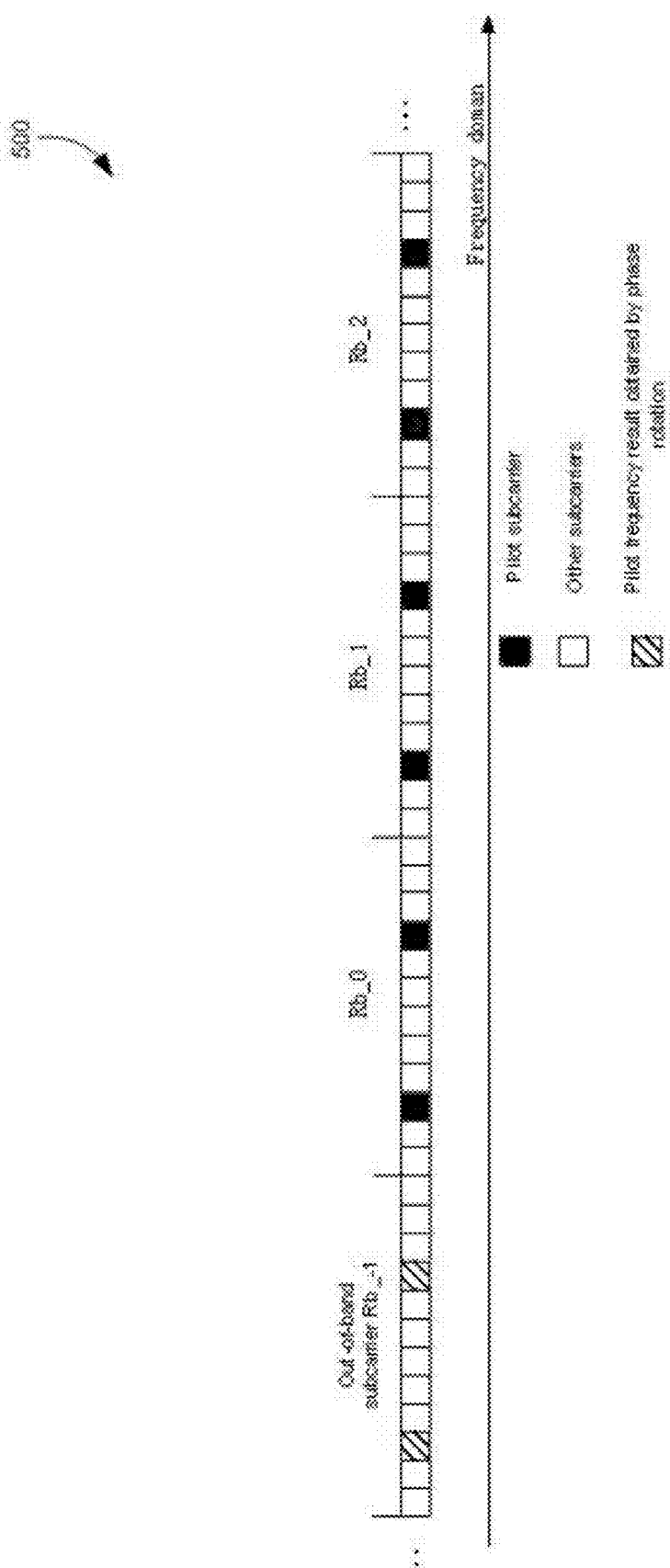
FIG. 5 illustrates the frequency domain subcarriers of Symbol of Cell-RS pilot frequency in an LTE system, according to another embodiment of the invention.

FIG. 5 illustrates the frequency domain subcarriers of Symbol of Cell-RS pilot frequency in an LTE system, according to another embodiment of the invention. In one embodiment, for a receiver, the effective subcarriers are between Rb_0 and Rb_N−1, and the data is demodulated within this band. For channel estimation, pilot frequencies are selected from the effective subcarriers, descrambled, and smoothed. The smoothing results are channel estimation results, and all subcarriers can obtain channel estimation results after smoothing.

Based on the front subbands or the rear subbands, pilot frequency data is set as, i=0, 1, 2 ... 2*N−1 to calculate their average valve; or set as, m=0, 1,2,M−1, where M is pilot frequency number in frequency band used during edge patch. Calculating the phase of the subcarrier and is setas, m=0, 1,2, M−1, and calculating an average phase difference and normalize it to one subcarrier, m=0,1,M−2. The average of all phase differences and set as the result AvePhaseDif. Then, based on Ave and AvePhaseDif, as well as interpolating pilot frequency position and the pilot frequency position corresponding to Ave, the distance among the subcarriers so as to get the phase to be rotated can be obtained.

Figure 6:
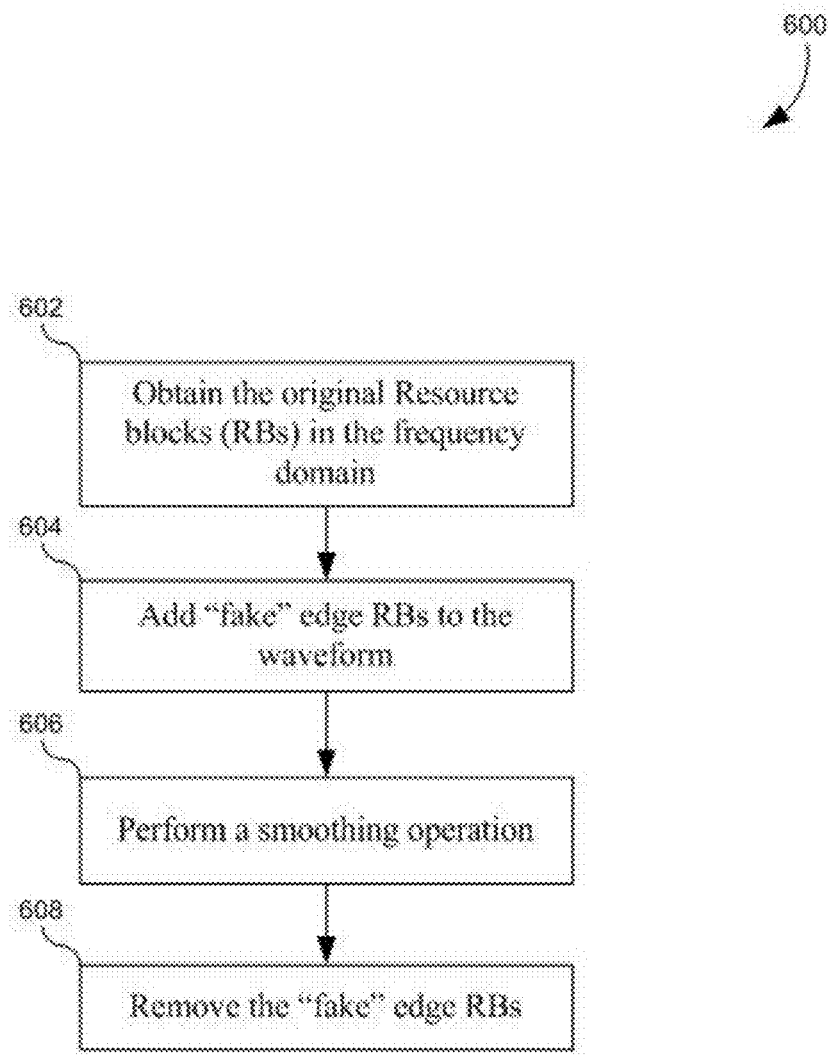
FIG. 6 illustrates a method for implementing the frequency domain subcarriers of Symbol of Cell-RS pilot frequency in an LTE system, according to another embodiment of the invention.

The Ave is phase rotated to obtain extrapolated pilot frequency, and the extrapolated pilot frequency is smoothed to obtain the channel estimation results. Turning now to FIG. 6, which illustrates a method 600 for obtaining the frequency domain subcarriers of Symbol of Cell-RS pilot frequency in an LTE system, according to another embodiment of the invention. At process block 602, the original Resource blocks (RBs) in the frequency domain are obtained. More specifically, the phases of subcarriers are determined, and the phase information and the corresponding amplitude therefore are normalized accordingly to determine the average.

At process block 604, "fake" edge RBs (can be from the beginning, the end, or in the middle gap) are added to the waveform. For example, to get RB(−1), get average phase/ amplitude of RB0, RB1, and RB2 (or RBm), to guess a waveform so that RB(−1) is continuous. Further, other methods to get "smooth" fake RB include copying over from RB_0 for RB_(−1). Then, a smoothing operation is perform (process block 606). In one embodiment, the smoothing operation includes applying a Weiner filter, a discrete Fourier Transform, etc. Then, at process block 608, the "fake" edge RBs are removed. For example, the amount of phase rotation needed for smoothing is calculated using Ave and AvePhaseDif values, and the phase rotation is applied to the corresponding subcarrier signal. For example, the phase rotation and adjustment is illustrated in FIG. 4. The right side of the waveform RB_1 is adjusted to that it connects to the left side of the waveform RB_0. For example, if RB_0 waveform starts at pi/4 from the left, RB_(−1) would terminate at pi/4 to connect to the RB_0 waveform. Similarly, if RB_N−1 terminates at 3pi/4, RB_N waveform would be adjusted (e.g., rotated) to start at 3pi/4 to connect with the RB_N−1 waveform. Also, referring back to FIG. 4, the average of amplitifude of the existing waveforms (i.e., RB_0 to RB_N−1). This average is used when generating "fake" waveforms RB_−2, RB_−1, RB_N, and RB_N+1. For example, as shown in FIG. 4, the amplitude of the "fake" and actual waveforms are substantially the same.

Alternative to the edge patch of the subcarriers being in the first part of the frequency domain; in other situations the edge patch can be in the middle or end of the frequency band. In this situation the same principle can be applied. For the subcarriers on external patching edge, the average value may not be used, but instead, one pilot frequency can be used to patch out-of-band pilot frequencies by a phase rotation. Further, the calculation of the phase difference can be simplified. Phase difference between two pilot frequencies can be initially calculated, phase to be rotated can be calculated based on space between the pilot frequencies, and then corresponding phases are rotated to obtain the extrapolated pilot frequency.

Figure 7:
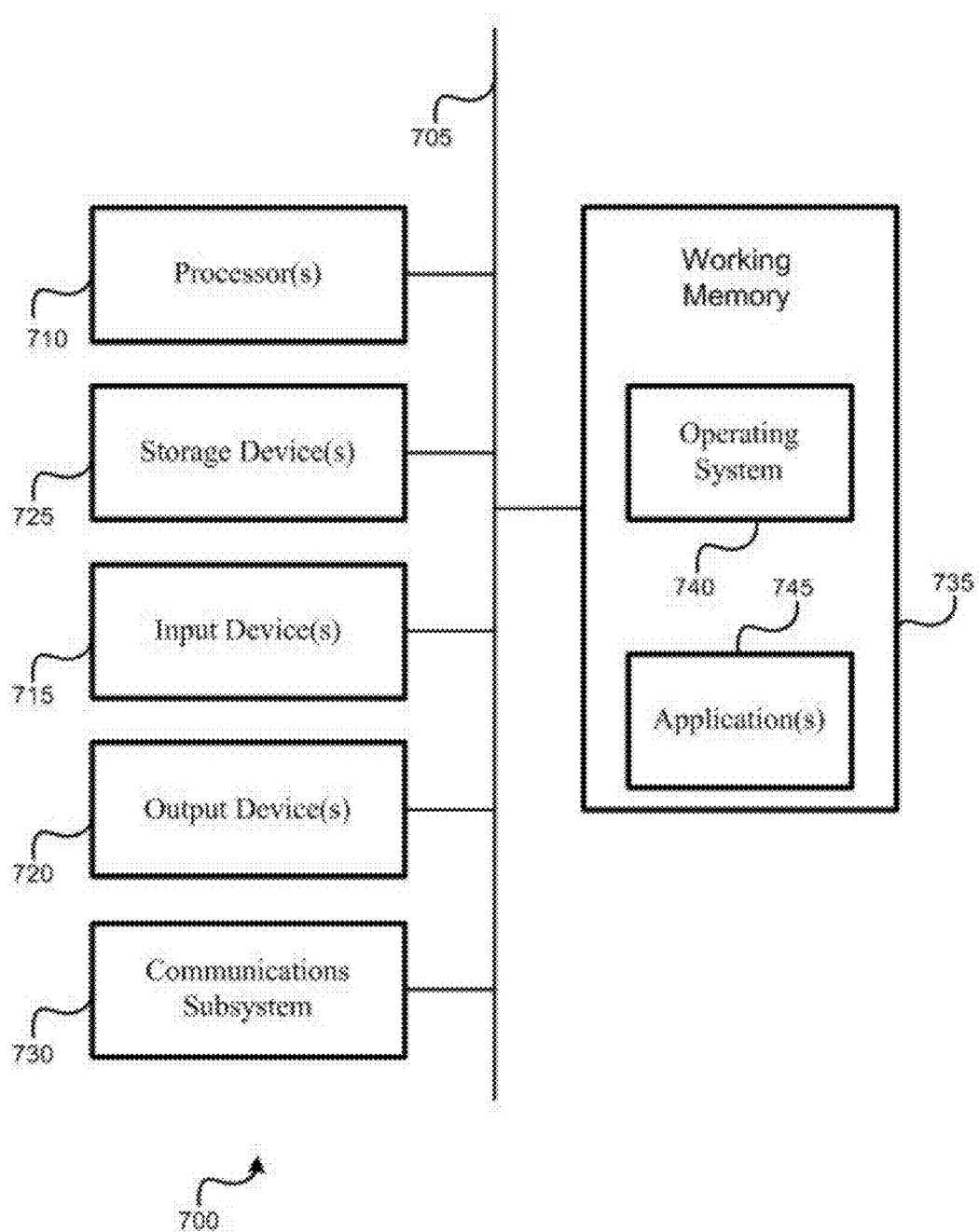
FIG. 7 illustrates a block diagram of an exemplary computer hardware system that may be used to implement various embodiments.

FIG. 7 illustrates a block diagram of an exemplary computer system 700 that may be used to implement various embodiments. Some embodiments may employ a computer system (such as the computer system 700) to perform methods in accordance with various embodiments of the invention. The computer system may be implemented using various circuits, microchips, and connections within a mobile device. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method of processing communication signals, the method comprising:
   receiving a communication signal in a time domain;
   converting the communication signal to a frequency domain;
   providing a plurality of resource blocks based on the communication signal in the frequency domain, the plurality of resource blocks, being arranged from left to right, including a first resource block and a second resource block on the right side of the first resource block, the first resource block having a first boundary on the right edge thereof and a second boundary on the left edge thereof, the first boundary being adjacent to the second resource block, the second boundary being non-adjacent to other resource blocks, the first resource block including one or more pilot signals;
   generating a third resource block based on the one or more pilot signals;
   providing a first waveform based at least on the plurality of resource blocks and the third resource block;
   applying a smoothing filter against the first waveform to generate a second waveform; and
   converting the second waveform from the frequency domain to the time domain.

2. The method of claim 1, further comprising removing the third resource block.

3. The method of claim 1, further comprising generating a fourth resource block at the edge of the second resource block.

4. The method of claim 1, wherein the smoothing filter comprises a Weiner filter.

5. The method of claim 1, wherein the smoothing filter comprises a discrete Fourier Transform.

6. The method of claim 1, further comprising generating the third waveform comprises one or more of: an average or an estimating waveform.

7. The method of claim 1, wherein the communication signal comprises an Orthogonal Frequency Division Multiplexing (OFDM) Signal.

8. The method of claim 1, wherein the communication signal is received via Long Term Evolution (LTE) communication network.

9. A system for processing communication signals, the system comprising:
   a memory device; and
   a computer processor in communication with the memory device, wherein the memory device includes sets of instructions when executed by the computer processor, cause the computer processor to:
   receive a communication signal in a time domain;
   convert the communication signal to a frequency domain;
   provide a plurality of resource blocks based on the communication signal in the frequency domain, the plurality of resource blocks, being arranged from left to right, including a first resource block and a second resource block on the right side of the first resource block, the first resource block having a first boundary on the right edge thereof and a second boundary on the left edge thereof, the first boundary being adjacent to the second resource block, the second boundary being non-adjacent to other resource blocks, the first resource block including one or more pilot signals;
   generate a third resource block based on the one or more pilot signals;
   provide a first waveform based at least on the plurality of resource blocks and the third resource block;
   apply a smoothing filter against the first waveform to generate a second waveform; and
   convert the second waveform from the frequency domain to the time domain.

10. The system of claim 9, wherein the sets of instructions further cause the computer processor to remove the third resource block.

11. The system of claim 9, wherein the sets of instructions further cause the computer processor to generate a fourth resource block at the edge of the second resource block.

12. The system of claim 9, wherein the sets of instructions further cause the computer processor to generate the third waveform comprises one or more of: an average or an estimating waveform.

13. The system of claim 9, wherein the communication signal comprises an Orthogonal Frequency Division Multiplexing (OFDM) Signal.

* * * * *